Sept. 18, 1951     L. B. LYNN ET AL     2,568,401
CONTROL DEVICE
Filed Oct. 19, 1945     3 Sheets-Sheet 1
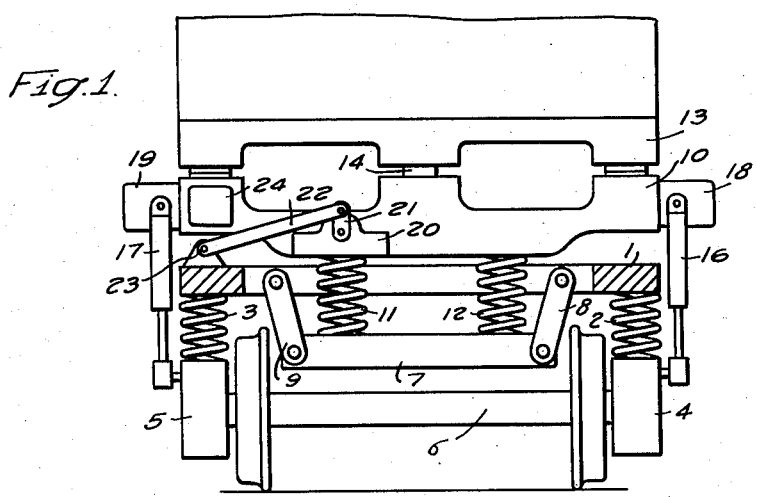
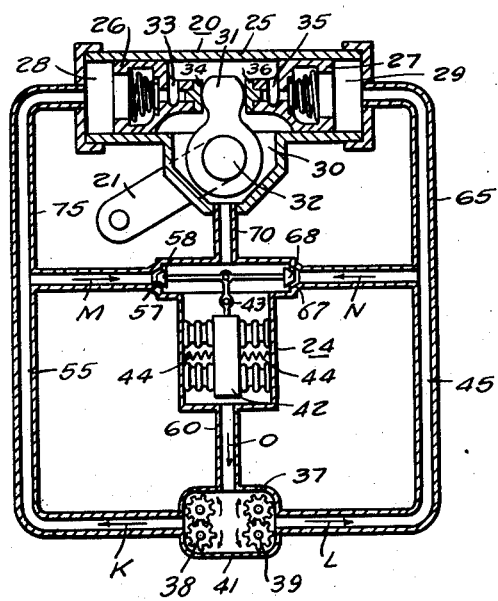
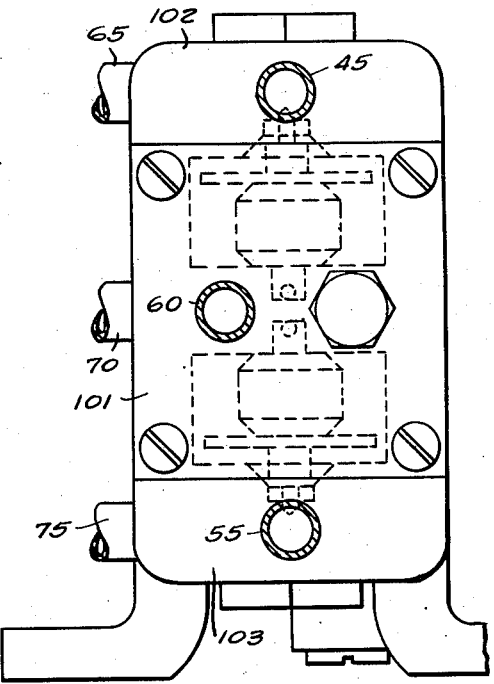
WITNESSES:
INVENTORS
Clinton R. Hanna and
Lawrence B. Lynn.
BY
Paul E. Friedemann
ATTORNEY Sept. 18, 1951     L. B. LYNN ET AL     2,568,401
CONTROL DEVICE Filed Oct. 19, 1945     3 Sheets-Sheet 2

WITNESSES:

INVENTORS
Clinton R. Hanna and
Lawrence B. Lynn.
BY
Paul E. Friedemann
ATTORNEY

Sept. 18, 1951  L. B. LYNN ET AL  2,568,401
CONTROL DEVICE
Filed Oct. 19, 1945  3 Sheets-Sheet 3
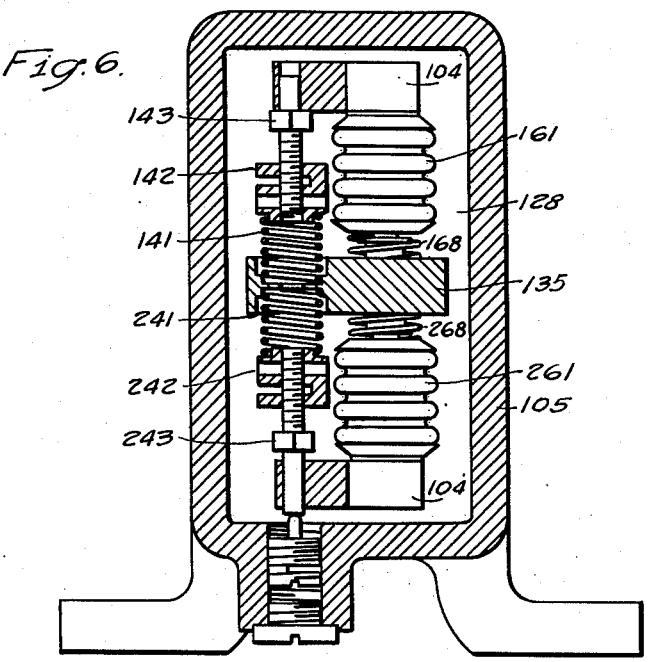
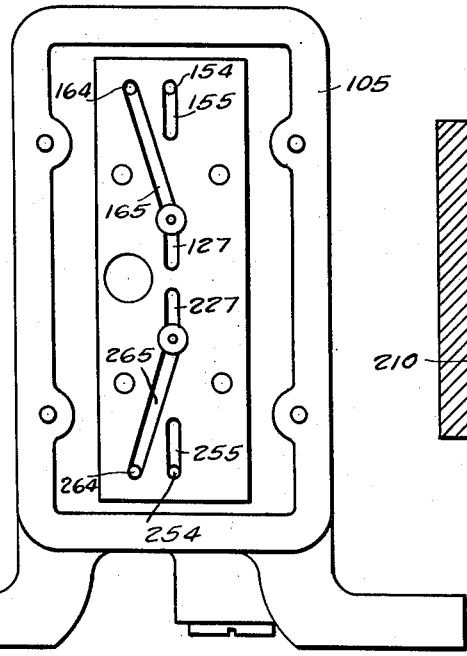
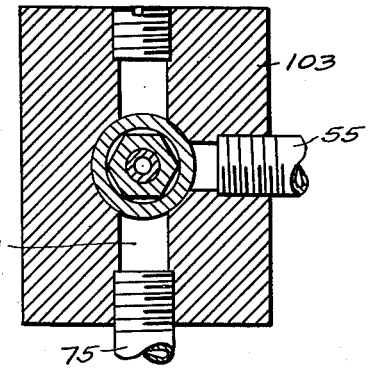
WITNESSES:
INVENTORS
Clinton R. Hanna and
Lawrence B. Lynn.
BY
ATTORNEY Patented Sept. 18, 1951

2,568,401

UNITED STATES PATENT OFFICE 2,568,401

CONTROL DEVICE

Lawrence B. Lynn, Wilkinsburg, and Clinton R. Hanna, Pittsburgh, Pa., assignors to Westinghouse Electric Corporation, East Pittsburgh, Pa., a corporation of Pennsylvania Application October 19, 1945, Serial No. 623,368

11 Claims. (Cl. 267—11)

My invention relates to systems for stabilizing the traveling motion of conveyances by damping, absorbing, balancing or otherwise counteracting undesired movement occurring transverse to the path of travel, and involves improvements of devices of the type disclosed in the application Serial No. 509,314, filed November 6, 1943, now Patent No. 2,492,990 issued January 3, 1950, by Clinton R. Hanna for Stabilizing Systems and assigned to the assignee of the present application.

The sprung body of a traveling vehicle is not only subjected to vertical and lateral oscillations but, when moving in a curved path, is also affected by a temporary unidirectional acceleration in the lateral direction. In order to improve riding comfort, a hydraulic system as described in the above-mentioned application, Serial No. 509,314, may be employed for stabilizing lateral oscillations. However, when a vehicle, thus equipped, passes through a curved path, the steady lateral force, imposed on the inertia member in the pilot valve of the equipment, causes the stabilizer to develop a unidirectional counterforce and thus acts as a bias which reduces the effectiveness of the equipment as regards the elimination of oscillatory or shock disturbances.

It is an object of our invention to provide an inertia controlled pilot device for stabilizing systems which is capable of differentiating between oscillating forces and the more permanent lateral bias forces of the last-mentioned kind, so as to secure an effective stabilizing performance also during periods of curved travel.

Steady bias effects detrimental to optimum performance of inertia controlled stabilizers are also apt to occur if the centering spring forces, acting on the inertia member of the pilot valve, become unbalanced. Such unbalances have been found to develop regardless of how carefully the centering springs are initially adjusted, and such unbalances may occur in equipment for stabilizing lateral motion as well as in stabilizers or shock absorbers for suppressing vertical oscillations and shock motions of a vehicle body.

It, therefore, is another object of our invention to eliminate or diminish the effects of undesired biasing forces in general, and more especially to avoid effects due to the development of a spring unbalance in the pilot valve of stabilizing equipment.

In order to render the stabilizing performance proportional to the velocity of the oscillations of the body to be stabilized, it is preferable to employ hydraulically controlled devices, such as bellows, for damping the deflecting movements of the inertia weight which controls the stabilizing performance of the system. Aside from the damping effect, such bellows also represent an elastic stiffness; that is, they act also as springs in addition to the centering springs proper. As a result, such damping bellows impose a secondary effect on the system which, though of minor magnitude, renders it short of perfect functioning.

Having this in mind, it is also an object of our invention to provide means which counterbalance the inherent spring stiffness of the damping devices in order to achieve a further improvement in stabilizing performance.

These and other objects, as well as the means provided by our invention for achieving them, will be apparent from the following description of the embodiment represented in the drawings in which:

Figure 1 is an explanatory diagram showing schematically a railroad car equipped with a stabilizing system;

Fig. 2 is also explanatory and shows the main hydraulic circuit diagram of one of the stabilizers of the same system;

Fig. 3 is a side elevation of a pilot device for a system as exemplified by Figs. 1 and 2;

Fig. 6 is a cross-section through the same device, the plane of section being indicated in Fig. 4 by the dot-and-dash line marked VI—VI and extending substantially vertically relative to Fig. 4;

Fig. 7 is a front view of a portion of the same device, the view being from the right of Fig. 5; and Fig. 8 is a cross-section through a portion of the same device taken along the horizontal plane denoted in Fig. 5 by the dot-and-dash line marked VIII—VIII.

Figure 4:
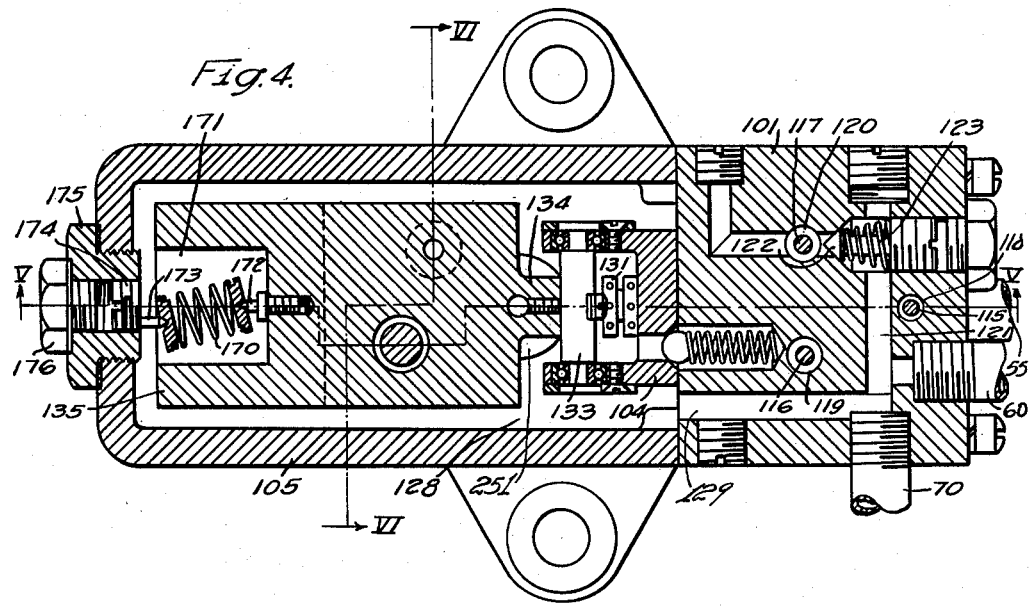
Fig. 4 is a cross section through the same pilot device.

Before describing the pilot device of our invention proper represented by Figs. 3 through 7, it appears preferable to convey at first a conception of what the device is intended to do and in what manner it may be incorporated in a stabilizing system for suppressing undesired oscillations of a vehicle body. Accordingly, Fig. 1 represents schematically a railroad car equipped with a system for stabilizing oscillations of the car body in a plane transverse to the path of travel.

According to Fig. 1, the truck frame 1 of a railroad car is supported by springs 2 and 3 on equalizer bars 4 and 5 which contain the bearings for the wheel axles, such as the one denoted by 6. Two swing links 8 and 9 are pivoted to opposite sides of the truck frame 1 and interconnected by a supporting structure 7. A bolster 10 is supported on the structure 7 by means of springs 11 and 12. The vehicle body 13 is pivoted at 14 to the bolster 10 so as to be capable of angular motion in a horizontal plane relative to the truck structure. Due to the springs 11 and 12 and the swing links 8 and 9, the truck bolster and the car body mounted thereon are also capable of angular motion as well as lateral and vertical motion in the plane of illustration.

Two shock-absorber cylinders 16 and 17 are hinged to the truck bolster 10, and their respective piston rods are connected to the equalizer bars 4 and 5, respectively. The shock absorbers serve to stabilize vertical oscillations and shock responsive movements of the car body. The stabilizing operation of the absorbers 16 and 17 is hydraulic and controlled by the appertaining pilot devices 18 and 19, respectively, substantially in the manner described in the above-mentioned copending application Serial No. 509,314.

Mounted on the truck bolster 10 is further a hydraulic shock absorber 20 which serves to stabilize the lateral pendulous oscillations of the car body occurring in the plane of illustration. The shock absorber 20 has a crank arm 21 linked by a member 22 to a pivot 23 which is firmly mounted on the truck frame 1. A pilot device 24 is provided for controlling the operation of the shock absorber 20 in the manner required to counteract the lateral oscillations to be stabilized.

The design and performance of the stabilizing systems will be understood from the diagrammatic showing of Fig. 2 which represents the hydraulic circuit of the shock absorber 20. According to Fig. 2, the shock absorber 20 has a cylinder 25 which contains two pistons 26 and 27, each forming together with the cylinder a pressure chamber 28 or 29. The neutral space 30 between the pistons 26 and 27 contains a ball-shaped coupling element 31 attached to a hub which is pivoted about a shaft 32. The shaft extends through the walls of the cylinder and carries the arm 21 exteriorly of the cylinder.

Piston 26 has a duct 33 which forms a communication between the pressure chamber 28 and the neutral space 30 and is controlled by a check valve 34. This valve prevents the flow of fluid from chamber 28 to the neutral chamber 30 while permitting the occurrence of flow in the opposite direction. Similarly, the piston 27 has a duct 35 which connects the pressure chamber 29 with the neutral chamber 30 and is controlled by a unidirectional valve 36 similar to valve 34. The pump 41 has a casing 37 which contains two pairs of impeller gears or rotors 38 and 39. These rotor pairs perform the action of two separate pumps, i. e., they operate simultaneously and in synchronism and have the same operating capacity. The outlet of one of the pumps is connected by pressure conduits 45 and 65 with the cylinder chamber 29. The second outlet of pump 41 is connected by conduits 55 and 75 with the cylinder chamber 28. The two conduit lines are interconnected by a bypass which forms escape openings at 57 and 67 and is in communication with the common inlet or sump of the pump 41 through a neutral conduit 60. The neutral chamber 30 of the cylinder 25 is also connected with the pump inlet by a neutral connection 70. The escape openings 57 and 67 are controlled by interconnected valves 58 and 68 which are normally in an intermediate position so as to maintain a given cross section of the appertaining escape opening.

The valves 58 and 68 form part of the pilot device 24 and are controlled by an inertia weight 42 which is pivoted at 43 so as to be capable of angular deflection relative to the housing of the pilot device when the car body carrying the device is subjected to oscillations. The pivot axis of the weight 42 extends horizontally and substantially in parallel to the path of travel so that the weight 42 is suspended like a pendulum.

While the foregoing explanation refers to the shock absorber 20, as shown in Fig. 1, for stabilizing lateral oscillations, it should be understood that the design and function of the vertical stabilizers 16 and 17 are in principle similar to the above-described features elucidated by Fig. 2, except that for stabilizing vertical oscillations, the corresponding pilot device 18 or 19 (Fig. 4) is so arranged that the pivot arm of the inertia weight extends horizontally in order to have the oscillatory deflections of the weight occur in a vertical plane. In other words, the pilot device is always so positioned that the inertia weight is caused to oscillate relative to the housing of the pilot device in response to the oscillations intended to be stabilized.

As shown in Fig. 2, the weight 42 is centered by means of springs 44 and is also associated with two pairs of hydraulic bellows. The purpose, design and function of these springs and bellows, as well as other details of the pilot device omitted in the explanatory showing of Fig. 2, will be described in a later place with reference to the embodiment shown in Figs. 3 through 8.

When in operation, the pump 41 is constantly driven so as to issue two separate streams of fluid in the direction of the arrows K and L. The fluid circulates through the escape openings 57 and 67 and returns to the pump through the neutral conduit 60 in the direction of the arrows M, N and O. The pressures built up in the two chambers 28 and 29 are normally balanced so that no moving force is imposed on the arm 21. Upon occurrence of an unbalance motion, however, the inertia weight 42 actuates the interconnected valves 58 and 68 so that one is caused to increase the cross section of its opening while the other reduces its opening. Consequently, the pressure in one of the cylinder chambers 28 and 29 is increased and the pressure in the other simultaneously decreased. Thus, the pistons 26 and 27 move in the same direction relative to cylinder 25 and cause the arm 21 to perform a relative motion tending to balance the lateral motion to be compensated. Due to the fact that the neutral chamber 30 of the cylinder 25 is in connection with the neutral conduits of the hydraulic circulation system, the pressure acting on the gaskets and joints of the absorber is reduced, thereby reducing or avoiding the loss of operating fluid.

The novel features of our invention are all incorporated in the inertia responsive pilot device 24 and will now be described in detail with reference to Figs. 3 through 8. In order to facilitate explaining these figures, the conduits denoted in Figs. 1 and 2 by 45 and 65 are hereinafter called "compression conduits," while the conduits 55 and 75 are referred to as "rebound conduits" and the conduits 60 and 70 as "neutral conduits."

The pilot device, as shown in Figs. 3 through 8, contains a number of ducts and passages which are formed by bores, cavities and openings of five bodies denoted by 101, 102, 103, 104, and 105. These bodies are firmly and tightly connected with one another so as to form a rigid structure which serves as a fluid container and as a support for a number of movable elements described hereinafter.

The body 102 (Figs. 3 and 5) has a T-shaped combination of bores 110 which has a number of openings located at three different sides of the body, respectively. Some of these openings are plugged, while two of them, chosen for most convenient installation, are connected with the compression conduits 45 and 65 in accordance with the schematic representation of Fig. 2. The body 103, as it best apparent from Figs. 3 and 8, is of similar design. That is, it has also a T-shaped combination of ducts denoted by 210 which open towards three different sides of the body 103. Two of the openings are in connection with the rebound conduits 55 and 75, and the remaining openings are plugged.

Figure 5:
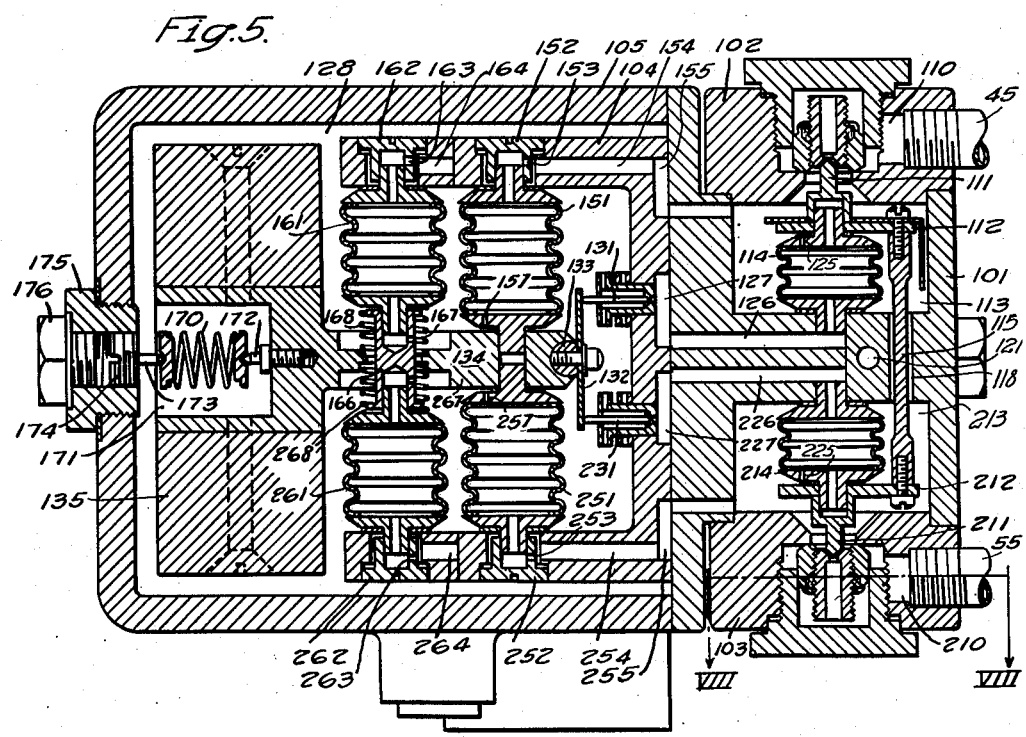
Fig. 5 is a sectional view of the same device, the section being taken substantially horizontally along the plane denoted in Fig. 4 by the dot-and-dash line marked V—V.

The duct 110 in body 102 has a branch which opens into an intermediate pressure chamber 113 formed between bodies 101 and 102 (Fig. 5). The opening is controlled by a poppet valve whose valve member 111 is attached to a disk 112. The duct 210 in body 103 opens into an intermediate pressure chamber 213 formed between the bodies 101 and 103. The opening is controlled by a poppet valve member 211 attached to a disk 212. The two disks 112 and 212 are rigidly connected with each other by three struts 115 (Figs. 4 and 5), 116, and 117 (Fig. 4) which extend through corresponding bores 118, 119 and 120, respectively, of body 101. The diameter of these bores is larger than that of the struts so that the annular spaces between the struts and the wall of the bores form hydraulic communications between the intermediate pressure chambers 113 and 213. The bore 120 surrounding the strut 117 is in communication with a transversal duct 121 in body 101 (Fig. 4), which, in turn, communicates with the neutral conduit 60 leading to the pump and the neutral conduit 70 leading to the shock absorber. The communication between bore 120 and duct 121 is controlled by a poppet valve 122 biased by a spring 123 which checks the flow of oil from the neutral conduits 60 and 70 toward the intermediate pressure chambers 113 and 213 but permits a flow of oil from these intermediate pressure chambers into the neutral conduits. The setting of this valve determines the value of the intermediate pressure maintained in chambers 113 and 213.

As far as described, the control device, in conjunction with the pump, conduits, and shock absorber of the system, represents a circulation system in accordance with the principle previously explained in connection with Fig. 2. This will be clear from the following consideration. The oil flow from the rebound chamber of each shock absorber, passing through the rebound conduit 75, merges with the oil flow from the pump which is supplied through the conduit 55 (Fig. 8). In the same way, the oil flow through the compression conduit 45 merges with the flow through the compression conduit 65 coming from the compression chambers of the shock absorber (Fig. 3). The merging oil flow from the compression side of the system passes through the intermediate pressure chamber 113 and thence into the bore 120 from which it passes into the neutral duct 121 which is connected with the neutral pump conduit 60 as well as with the neutral conduit 70 leading to the shock absorber (Fig. 4). The poppet valve 111 is normally open, and the oil passing through the valve 111 escapes into the neutral duct. Consequently, a continuous circulation of oil is maintained between the pump and through the intermediate pressure chamber 113 back to the neutral conduit and the inlet side or sump of the pump. Likewise a similar circulation of oil is normally maintained from the pump through the rebound conduit 55 and the opening of control valve 211 to the intermediate pressure chamber 213 and thence back through the bores 120 and 121 to the neutral side of the conduit system. Since the two valves 111 and 211 are mechanically interconnected, the operation of these valves has the effect of reducing the cross section of the escape opening at 111 when increasing the corresponding cross section at the other valve 211 and vice versa. Consequently, during the actuation of these valves, the pressure in the compression chamber of the shock absorber is increased while the pressure in the rebound chamber is decreased and vice versa, as explained above with reference to the diagram of Fig. 2.

The just-mentioned push-pull operation of the main control valves is effected by an auxiliary hydraulic system which is so linked with the above-described main operating system as to derive its power therefrom. The hydraulic actuating means of valve 111 comprise an expansible bellows 114 which is arranged in the intermediate pressure chamber 113 and has an axially located duct connected with a bore 126 of body 101 (Fig. 5). The interior of the bellows 114 communicates also with the intermediate pressure space 113 through a metering orifice 125. Bore 126 is in registry with a cavity 127 of body 104 (Figs. 5 and 7) which communicates with the inner space 128 of body 105 through a poppet-type pilot valve 131 (Fig. 5). This valve controls the operation of the actuating bellows 114 in a manner to be described, presently.

The inner space 128 of body 105 is connected by a duct 129 with the neutral duct 121 in body 101 (Fig. 4), and hence with the neutral conduit 60 leading to the pump. Consequently, a continuous flow of fluid is branched off from the intermediate pressure space 113 (Fig. 5) through the orifice 125, the ducts 126 and 127, the interior 128 of body 105, and through the duct 129 (Fig. 4) back to the neutral side of the hydraulic system. The pilot valve 131 is normally maintained in an intermediate position. Consequently, a constant stream of liquid passes through the conduit 126 and escapes through ducts 127 and 129 to the low pressure side of the hydraulic system. Any change in position of the pilot valve 131, varying the effective cross section of the appertaining escape opening of cavity 127 will cause the bellows 114 to expand or contract depending upon the direction of the pilot-valve movement. This arrangement of the main control valve 111 and the pilot valve 131 has the effect that a relatively small motion and force at the pilot valve 131 produces a large motion and force at the main valve 111, and that a relatively small flow of fluid through the pilot valve is sufficient to control the amplified motion of the main valve. Thus this action is, in effect, a multiplying operation.

The hydraulic actuating member of the valve disk 212 consists of a bellows 214 which is arranged coaxially with the above-mentioned bellows 114 and in communication with a duct 226. A constant flow of fluid is supplied to this duct through an orifice 225 from the intermediate pressure chamber 213 and passes through a bore 226, a cavity 227, and an escape duct controlled by a pilot valve 231 into the low-pressure interior 128 of the body 105 (Fig. 5), whence the fluid escapes to the neutral pump conduit 60 through the duct 129 (Fig. 4). The multiplying function of this valve system is similar to that of the above-described valve combination. The two pilot valves 131 and 231 are actuated by a common control member 132. Member 132 is attached to a shaft 133 which is journalled on body 104 (Figs. 5 and 6) by ball bearings and carries an arm 134 joined with the inertia mass 135. Due to the interconnection of the two pilot valves, a motion of the mass 135 relative to the stationary structure of the device has opposite effects on the two valves. That is, when pilot valve 131 increases the cross section of its flow area and hence causes the bellows 114 to contract, the pilot valve 231 will decrease its area of flow and hence cause the pressure in bellows 214 to rise and to expand this bellows (push-pull action).

The mass 135 is held in centered position by two coiled compression springs 141 and 241 (Fig. 6) whose stationary abutments 142 and 242 are adjustable by means of respective screws 143 and 243. The rather large mass 135 develops forces proportional to the absolute acceleration of the vehicle sprung mass to which the control device is attached. These forces, instead of being applied in their entirety to the pilot valves 131 and 231, are resisted predominantly by a pair of damper bellows 151 and 251. The function of bellows 151 and 251 is to damp the motion of mass 135 so that it moves about its pivot axis with a small relative velocity proportional to its inertia force, which, in turn, is proportional to the lateral acceleration of the vehicle body. As a result, the relative distance of motion of the mass is proportional to the lateral velocity of the body. In other words, the small displacements of the control mass are proportional to the absolute lateral velocity of the vehicle sprung mass over a broad range of frequencies within which a satisfactory stabilizing performance is expected.

The pilot valves 131 and 231 together with their respective orifices 121 and 221 are so proportioned that the difference in their pressures acting within the actuating bellows 114 and 214 of the main poppet valves 111 and 211 is approximately proportional to the movement of mass 135. Since the multiplier valve arrangement previously described produces pressure differences between compression and rebound proportional to the difference of the pressures within bellows 114 and 214, the net stabilizing force produced in the shock absorbers proper is substantially proportional to the absolute velocity of the sprung mass.

The damper bellows 151 and 251 form part of a hydraulic system which is so designed that the damping force is proportional to the velocity of the bellows motion and independent of the viscosity of the operating fluid. In order to obtain this result, the following means are employed. The damper bellows 151 and 251 are mounted on the body 104 by means of fastening screws 152 and 252 which have orifices 153 and 253, respectively, through which the interior of the bellows communicates with a bore 154 and 254, respectively, of the body 104. Each of these bores opens into a cavity 154 or 254 (Figs. 5 and 7), which is in free communication with the intermediate pressure chamber 113 or 213. Two similar thin-wall orifices 157 and 257 are provided in the inner cover plates of the bellows 151 and 251, respectively. Due to these hydraulic connections, a constant flow of fluid is maintained from the intermediate pressure chamber 113 through the cavity 155, the bore 154, the orifice 153, the bellows 151 and the orifice 157 to the low-pressure space 128 (Fig. 5) and thence back through duct 129 (Fig. 4) to the neutral connections of the system. Similarly, a second fluid path is formed between the intermediate pressure chamber 213 through cavity 255, bore 254, orifice 253, bellows 251, and orifice 257 to the low-pressure chamber 128.

The flow of oil that passes from the intermediate pressure space 213 through the orifice 253 and the orifice 257 to the low-pressure area 128 develops pressure in the bellows 251 between the two orifices 253 and 257. When the bellows 251 is compressed by a deflecting motion of the mass 135, oil is expelled from the bellows through the orifices 253 and 257. The flow expelled from orifice 257 acts in the direction of the flow coming from the chamber 213, while the flow coming from orifice 253 acts in opposition to the constant flow from chamber 213. Hence, the total unidirectional flow through orifice 253 is diminished while the total flow through orifice 257 increases. Although the law for each orifice is that the pressure is proportional to the square of the oil velocity through it, the fact that one flow diminishes and the other increases for a given bellows movement results in a push-pull action with the effect of obtaining an approximately linear law of pressure versus velocity of the bellows. This linear law is independent of changes in viscosity of the oil because the throttle characteristic of thin-wall orifices is nearly independent of viscosity. The same viscosity-independent damping effect takes places in the hydraulic-branch system of bellows 151.

During the above-described operation of the pilot device, the centering force acting on the inertia weight is provided mainly by the springs 141 and 241, but some of the centering force is also determined by the springs 168 and 268 and by the toggle spring 170.

The two springs 168 and 268 are so rated that they do not interfere with the response of the inertia valve to the relatively fast occurring oscillations of the vehicle body to be stabilized. Hence, the springs 168 and 268, during the oscillatory functioning of the inertia controlled pilot valves 131 and 231, exert merely balanced component spring forces on the inertia weight in supplement of the centering forces provided by the main springs 141 and 241 (Fig. 6). Since the bellows 161 and 261 at no time abut against the arm 134 of the inertia mass, they have no damping effect on the mass. Their purpose is to form self-adjusting abutments for the respective springs 168 and 268 (Fig. 5). When the car passes through a curve, or when for other reasons a steady deflection from the centered position is imparted to the inertia mass, the pilot valves 131 and 231 will remain differentially adjusted for a greater length of time than during vibration periods. The pressures in chambers 127 and 227 become different. As a result, the main valves 111 and 211 remain also differentially adjusted and the corresponding pressures in chambers 110 and 210 (Fig. 5) stay also different. Consequently, the persistence of a steady deflecting bias on mass 135 imposes a corresponding bias on the main valves and on the stabilizing devices controlled thereby. Hence, during such periods of time the system tends to behave as if it were improperly centered, so that its response to vibrations is correspondingly affected.

However, the persistence of a pressure difference between chambers 127 and 227 has the effect of causing a proportional difference in pressure to appear in bellows 161 and 261 so that one of them is expanded and the other contracted. This is due to the fact that the interior of bellows 161 is in communication with cavity 127 through the opening 163 of screw 162 and the ducts 164 (Fig. 5), and 165 (Fig. 7) while bellows 261 communicates with cavity 227 through opening 263 of screw 262 and the ducts 264 (Fig. 5) and 265 (Fig. 7). Bellows 161 and 261 are also in communication with the neutral space 128 through respective openings 167 and 267 of fixed cross section. Hence, a continuous flow of liquid obtains from the chambers 127 and 227 through the respective bellows 161 and 261. The pressure thus caused in bellows 161 is normally balanced by the pressure in bellows 261. A pressure difference between chambers 127 and 227, if lasting long enough, is imparted to the bellows so that body 166 is shifted. As a result, one of springs 168, 268 is more compressed and the other correspondingly relieved. In this manner, the centering spring force acting on the inertia mass becomes modified in the direction required to counterbalance the steady deflecting bias until the correct centering is reestablished. Consequently, the device remains capable of responding properly to vibration even during periods of curved travel or under other conditions causing the occurrence of a persistent bias.

In order to secure the just-mentioned effect, the hydraulic branch system for adjusting the compensating springs 168 and 268 must be designed to distinguish between the fast vibrations to be stabilized and the relatively slow-acting bias phenomena. To this end, the areas of restriction of the orifices 163, 167 and 263, 267 are rated, relative to the spring constants of springs 168 and 268, so as to result in the necessary delay in the compensating spring adjustment. For instance, in the case of rail vehicles, the period of resonant vibration of the car body in a horizontal direction transverse to the path of travel (i. e., in the plane of vibration of Fig. 1) is in the order of magnitude of 1 cycle per second. If the delay of the compensating system is adjusted to be in the order of 10 seconds, this system has virtually no influence on the normal function of sensing the free oscillations of the car body. In contrast thereto, accelerations arising from curved travel may persist for several minutes, and hence responded to and balanced out. Likewise, any other steady effect, such as an unbalance in the adjustment of the centering spring, is likewise corrected by the self-adjusting compensating system.

The damping bellows 151 and 251, serving to render the inertia response proportional to the velocity of the oscillations to be stabilized, have necessarily a certain elastic stiffness which introduces an undesired modifying effect in addition to the hydraulic damping function. Likewise, the centering springs 141, 241 and the assembly of springs 168, 268 and controlled bellows 161 and 261 introduce a stiffness into the centering suspension which affects somewhat the performance of the device. It will, therefore, be understood that a further refinement can be obtained if the stiffness of the suspension and biasing means is eliminated or counterbalanced. To this end, the device, according to Figs. 4 and 5, is provided with a toggle spring 170 which is located in a cavity 171 of the inertia weight 135. The toggle spring is of the helical compression type and has one abutment in engagement with a bearing pin 172 attached to the weight 135. The other abutment of spring 170 rests against a pin 173 which is eccentrically attached to an adjusting screw 174. This screw engages a sleeve 175 screwed into the housing 105. The screw 174 is accessible upon removal of a cover screw 176. By turning the screw 174, the compression of the spring 170 can be varied and the eccentricity of the pin 173 can be adjusted so that the toggle axis extends in the suitable direction. When the inertia weight 135 is in its center position, as shown in Fig. 5, the toggle axis extends approximately in the radial direction relative to the pivot axis of the weight, with the exception of a slight eccentricity which is so chosen that the force of spring 170 just balances any undesired biasing effect in the plane of illustration of Fig. 4 that the totality of centering springs may otherwise impose on the weight.

When the weight 135, in response to lateral oscillations of the car body, deflects from the centered position, the toggle spring 170 develops a component spring force in the deflecting direction of the weight. This component force acts in opposition to the then effective stiffness of the damping bellows and other biasing means, and hence counteracts such stiffness. In other words, the toggle spring 170 may be considered to have negative stiffness which corrects the stiffness of the biasing means and thereby improves the accuracy of the control performance.

As described in the foregoing, the bellows provided in the control device according to our invention for actuating the main valves, and those for damping the movements of the inertia weight, and those for adjusting the centering springs 168 and 268 are so designed that they have each an inlet opening and an outlet opening and form part of a conduit branch which is continuously traversed by a flow of liquid. In this respect, the just-mentioned parts of our device are favorably distinguished from comparable variable-volume container or bellows according to prior suggestions which respond to static hydraulic pressure rather than to a dynamic pressure developed by the continuous passage of fluid flow through the container or bellows. Due to the fact that the bellows of our device are continuously scavenged by the liquid flowing therethrough, the formation of air or gas enclosures in the bellows is effectively prevented. While, for instance, in the pilot device disclosed in the above-mentioned copending application care must be taken to obtain a complete filling of the bellows with liquid before putting the system in operation, the just-mentioned improvement eliminates the necessity of such special care, because the mere starting of the fluid flow through the main conduits and valves of the system has automatically the effect of passing liquid through the bellows and thus filling each bellows completely. Hence, such a device is always in immediate operating condition even after long inoperative periods.

The provision of spare outlet openings in the body of the valve has not only the above-mentioned advantage of facilitating installing the pilot device on vehicles of different design, but permits also the addition of one or several shock absorbers to act in parallel to the abovementioned absorber under control by a single pilot device.

While some of the features of our invention as disclosed in the foregoing are most advantageous in equipment for stabilizing lateral oscillations due to curved travel of a vehicle, the invention is likewise of considerable advantage when applied to equipment for stabilizing oscillations in other directions and some of its features are of general applicability. It will further be understood by those skilled in the art that devices according to the invention can be modified in many respects as regards details of design or specific use without departing from the gist of the invention, and within the scope of its essential features as set forth in the claims attached hereto.

We claim as our invention:

1. An inertia controlled pilot device for stabilizing equipment, comprising means for controlling the operation of said equipment, an inertia structure disposed for controlling said control means and being pivoted for angular deflection from a centered position in response to oscillations to be stabilized, spring means engaging said structure for biasing it toward said centered position, said spring means comprising two helical compression springs arranged on opposite sides respectively of said structure relative to its path of oscillatory motion, a rigid abutment structure forming two abutments for said respective springs and being displaceable substantially in parallel to said path of motion in order to vary the center point of the spring bias, and control means for displacing said abutment structure in response to persistent deflections of said inertia structure and in the direction required for said bias to oppose said persistent deflection, said control means having delayed operation relative to said oscillations so as to remain substantially unaffected by said oscillations.

2. An inertia controlled pilot device for stabilizing equipment, comprising means for controlling the operation of said equipment, an oscillatory mechanical system disposed for actuating said control means and having an inertia weight capable of deflecting motion in response to oscillations to be stabilized, spring means engaging said weight for biasing it toward a center point, hydraulic means disposed for adjusting said spring means in order to vary said center point and comprising a container of variable volume, conduit means communicating with said container for applying hydraulic pressure to said container, and valve means disposed in said conduit means and operatively connected with said weight for controlling said pressure in response to persistent deflection of said weight.

3. An inertia controlled pilot device for the control of hydraulic stabilizing equipment, comprising valve means for modifying hydraulic pressure in order to control the stabilizing equipment, an inertia structure disposed for controlling said valve means and being pivoted for angular deflection from a centered position in response to oscillations to be stabilized, biasing means engaging said structure for biasing it toward said centered position, and having two springs arranged on opposite sides respectively of said structure relative to its path of oscillatory motion, a rigid abutment structure forming two abutments for said respective springs and being displaceable substantially in parallel to said path of motion in order to displace the center point of the spring bias, and hydraulic control means for displacing said abutment structure having a variable volume-container and conduit means for applying variable pressure to said container in dependence upon the pressure controlling operation of said valve means, said hydraulic control means having delayed operation relative to the average cycle period of said oscillations to remain substantially unaffected by said oscillations.

4. An inertia controlled pilot device for the control of hydraulic stabilizing equipment, comprising a housing having ducts for the passage of a continuous fluid flow for controlling the stabilizing equipment and provided with valve means for controlling said fluid flow, an inertia structure disposed in said housing for controlling said valve means and being pivoted for angular deflection from a centered position in response to oscillations to be stabilized, spring means engaging said structure for biasing it toward said centered position, said spring means comprising two helical compression springs arranged on opposite sides respectively of said structure relative to its path of oscillatory motion, a rigid abutment structure forming two abutments for said respective springs and being displaceable substantially in parallel to said path of motion in order to displace the center point of the spring bias, two variable volume containers engaging said abutment structure and being disposed at opposite sides thereof, said containers being in communication with said ducts to be controlled by pressure originating from said fluid flow under control by said valve means so that one container is caused to contract while the other expands whereby said pressure causes said abutment structure to be displaced in response to persistent deflections of said inertia structure and in the direction required for said bias to oppose said persistent deflection, the communication between said containers and said ducts being rated for time delayed operation in order to prevent said abutment structure from responding to said oscillations.

5. An inertia-controlled pilot device for stabilizing equipment, comprising a supporting structure, a mass movably mounted on said support so as to be capable of inertia-controlled motion relative to said support, a variable-volume container having two openings and being arranged between said structure and said mass for varying its volume in dependence upon said relative motion, fluid conduit means communicating with said container through said openings for passing a continuous flow of fluid through said container, said conduit means having flow-restricting orifices at both sides of said container so that the fluid flow through one of said orifices is increased and the flow through the other decreased during a change in volume of said container whereby the pressure in said container is caused to damp the motion of said body, and control means disposed between said structure and mass to be operated by their damped relative motion.

6. An inertia controlled pilot device for stabilizing equipment, comprising an inertia structure pivoted for angular deflection from a center position in response to oscillations to be stabilized, biasing means engaging said structure to oppose said deflection, and a toggle spring engaging said structure so as to have its toggle axis extend approximately in line with the pivot radius of said structure when the latter is in said center position in order to counteract the stiffness of said biasing means when said structure is deflected from said position.

7. An inertia controlled pilot device for stabilizing equipment, comprising an inertia structure pivoted for angular deflection from a center position in response to oscillations to be stabilized, biasing means engaging said structure to oppose said deflection and including a hydraulic damper bellows for damping the deflecting motion, and a toggle spring engaging said structure so as to have its toggle axis extend approximately in line with the pivot radius of said structure when the latter is in said center position in order to counteract the stiffness of said bellows when said structure is deflected from said position.

8. An inertia controlled pilot device for stabilizing equipment, comprising a housing, an inertia member pivoted in said housing for angular deflection from a center position in response to oscillations to be stabilized, biasing means engaging said structure to oppose said deflection, a compressible toggle spring having one end in engagement with said structure, a member revolvably mounted on said housing and having an eccentric abutment engaged by the other end of said spring in order to permit adjusting the toggle axis of said spring so as to render said spring substantially ineffective relative to said biasing means when said structure is in said center position while causing it to counteract the stiffness of said biasing means when said structure is deflected from said position.

9. An inertia controlled pilot device for stabilizing equipment, comprising movable pilot means for controlling the operation of said equipment, an oscillatory mechanical system disposed for actuating said pilot means and having an inertia weight oscillatorily mounted for motion in response to oscillations to be stabilized, two oppositely acting springs connected with said weight for imposing centering force thereon, two rigidly interconnected abutments engaged by said respective springs and being together movable separately from said pilot means in order to vary said centering force, and actuating means operatively connected with said pilot means to be controlled thereby and connected with said abutments for moving said abutments in response to persistent deflection of said weight in order to vary said centering force so as to counterbalance said persistent deflection.

10. A pilot device for hydraulic ride stabilizing systems, comprising a main hydraulic control valve having a movable member for controlling the stabilizing operation, a variable-volume container having two openings and being connected with said member for controlling the movement of said member, means for supplying a flow of liquid, an auxiliary hydraulic conduit system connected with said means and forming together with said container and through said openings a continuous path for said flow so that said container is continuously traversed by said flow, and an inertia-controlled auxiliary valve disposed in said path outside said container for varying the quantity of said flow in order to control pressure in said container.

11. A damping device, comprising a supporting structure, a movable member whose motion is to be damped, two damping containers each having two relatively movable parts defining a chamber of variable volume and attached to said structure and said member respectively, said containers being disposed in mutually opposing relation to said member so that movement of said member causes the volume of one chamber to increase and that of the other to decrease, each of said containers having an inlet opening and an outlet opening for said chamber, said openings having constant flow areas, and means for supplying a continuous flow of liquid having respective passage means communicating through said openings with said chambers for passing said continuous flow of liquid through said chambers to produce respective pressures in said chambers which normally balance each other relative to said member.

LAWRENCE B. LYNN.
CLINTON R. HANNA.

REFERENCES CITED

The following references are of record in the file of this patent:

UNITED STATES PATENTS

| Number | Name | Date |
|---|---|---|
| 1,319,848 | Carbt | Oct. 28, 1919 |
| 1,861,821 | Schaum | June 7, 1932 |
| 2,063,747 | Olley | Dec. 8, 1936 |
| 2,147,990 | Richter | Feb. 21, 1939 |
| 2,166,956 | Kollsman | July 25, 1939 |
| 2,212,426 | Mitereff | Aug. 20, 1940 |
| 2,492,990 | Hanna | Jan. 3, 1950 |

FOREIGN PATENTS

| Number | Country | Date |
|---|---|---|
| 346,493 | Great Britain | Apr. 16, 1931 |
| 612,843 | Germany | May 6, 1935 |